(12) United States Patent
Tannen et al.

(10) Patent No.: US 10,334,072 B2
(45) Date of Patent: Jun. 25, 2019

(54) CHARACTERIZING DATA USING DESCRIPTIVE TOKENS

(71) Applicant: Facebook, Inc., Menlo Park, CA (US)

(72) Inventors: Jonathan Tannen, Menlo Park, CA (US); Bogdan State, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 459 days.

(21) Appl. No.: 14/985,230

(22) Filed: Dec. 30, 2015

(65) Prior Publication Data

US 2017/0193073 A1    Jul. 6, 2017

(51) Int. Cl.
*H04L 29/08* (2006.01)
*G06F 16/9537* (2019.01)
*G06F 16/35* (2019.01)

(52) U.S. Cl.
CPC ............ *H04L 67/306* (2013.01); *G06F 16/35* (2019.01); *G06F 16/9537* (2019.01); *H04L 67/02* (2013.01); *H04L 67/327* (2013.01)

(58) Field of Classification Search
None
See application file for complete search history.

(56) References Cited

U.S. PATENT DOCUMENTS 9,904,690 B1 * 2/2018 Ferries .............. G06F 17/30241
2016/0155181 A1 * 6/2016 Romaya ............. G06Q 30/0282
705/26.63

* cited by examiner

*Primary Examiner* — Tuankhanh D Phan
(74) *Attorney, Agent, or Firm* — Baker Botts L.L.P.

(57) ABSTRACT

In one embodiment, a method includes a computing device receiving postings from users of an online social networking system. A postings may include location data along with one or more tags that may describe the content of the posting. The computing device may identify regions and subregions from which the postings originated, and may determine a distribution of the tags according to two data dimensions: the ubiquity of the tags across the regions, and the ubiquity of the tags across the subregions. Based on the distribution, the computing device may create a neighborhood characterization to accurately describe one or more subregions. The computing device may also determine applications for the neighborhood characterization.

20 Claims, 7 Drawing Sheets

FIG. 4

CHARACTERIZING DATA USING DESCRIPTIVE TOKENS

TECHNICAL FIELD

This disclosure generally relates to categorizing content.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Different neighborhoods have different environments or atmospheres. Neighborhoods can be urban, hipster, family-friendly, ethnic, "yuppie," suburban, etc. Neighborhoods can also be known or famous for having good clubs, fine dining, being dangerous, having particularly good elementary schools, being commuter friendly, and the like. The invention described herein may aggregate and analyze data collected from an online social network to generate an accurate characterization (e.g., description) of a particular neighborhood.

In particular embodiments, an online social networking system may provide characterizations of subregions within particular regions. In addition, the invention described herein may allow the social networking system to identify multiple subregions having a particular characterization, describe a particular subregion in terms of one or more characterizations, and/or quantify the similarity between different subregions. In particular embodiments, the regions may be cities or states, and the subregions may be neighborhoods within a city or state. For example, Elliston Place may be a subregion (e.g., neighborhood) within the region (e.g., city) of Nashville, Tenn. However, this invention is not limited to cities, states, and neighborhoods, as will be explained below.

In particular embodiments, the online social networking system may receive postings from a plurality of users, the users located in one or more subregions within one or more regions. Each posting may contain location data and one or more user-generated hashtags that describe the posting. For example, a posting may contain location data indicating that it originated from Elliston Place in Nashville, Tenn., and it may be tagged with one or more of the following hashtags: "nightclub," "dancing," "nightlife," etc.

In particular embodiments, the online social networking system may aggregate many postings and create a distribution of the tags associated with the postings. The distribution may express a degree of specificity along two dimensions: region and subregion. Using the distribution, the online social networking system may identify tags that are common to neighborhoods but rare for a given city. Such tags may be indicative of the characterization of a given neighborhood. The online social networking system may identify these tags and then group tags originating from the same subregion together. Using semantic analysis, the online social networking system may generate a characterization for a particular subregion. This "neighborhood characterization" may comprise a few words that describe the subregion. The neighborhood characterization is not limited to actual neighborhoods; a neighborhood characterization can be performed on any suitable subregion, as will be explained below. Finally, the online social networking system may apply the characterization in a variety of ways. For example, targeting specific advertisements to neighborhoods with a particular characterization. This, as well as alternative embodiments, will be explained in detail below.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example word cloud from which a neighborhood characterization is generated.

DESCRIPTION OF EXAMPLE EMBODIMENTS

In particular embodiments, an online social networking system may provide characterizations of subregions within particular regions. In addition, the invention described herein may allow the social networking system to identify multiple subregions having a particular characterization, describe a particular subregion in terms of one or more characterizations, and/or quantify the similarity between different subregions. In particular embodiments, the regions may be cities or states, and the subregions may be neighborhoods within a city or state. For example, Elliston Place may be a subregion (e.g., neighborhood) within the region (e.g., city) of Nashville, Tenn. However, this invention is not limited to cities, states, and neighborhoods, as will be explained below.

Figure 1:
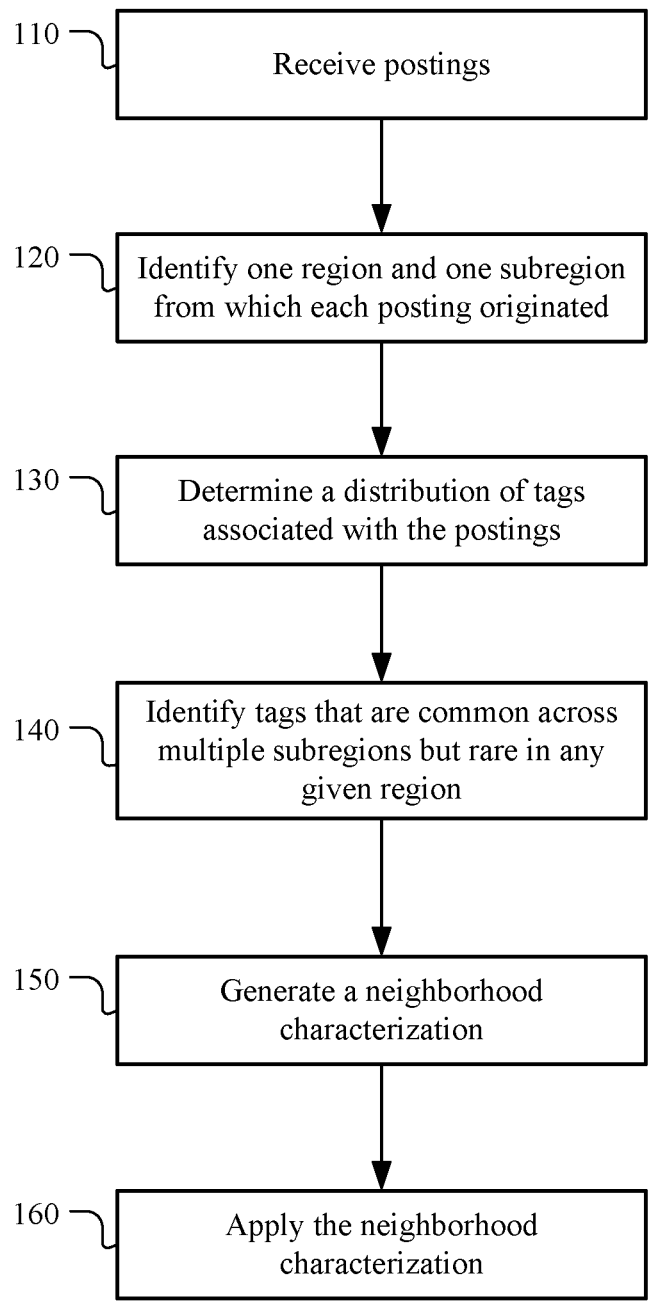
FIG. 1 illustrates an example method for providing a characterization of a particular subregion.

In particular embodiments, the online social networking system may aggregate postings from across many regions and subregions, analyze data associated with the postings, and generate a characterization of particular subregions. FIG. 1 illustrates an example method 100 for providing a characterization of a particular subregion. In step 110, the online social networking system may receive a plurality of postings from one or more users of the online social networking system. The users may be located in one or more geographic locations. The postings may comprise location data and one or more tags. The location data may identify the location from which the posting originates. The location data may comprise latitude and longitude data, global positioning system (GPS) data, Assisted or Synthetic GPS, Cell ID, Wi-Fi, IP address, inertial sensing data, near-field communication (NFC) data, Bluetooth data, and the like. The location data may also comprise information from a user's social graph. For example, a user may "check in" to Bobalicious Cafe, and then post a photo of her boba drink. Bobalicious Cafe may have disclosed their location on the Internet, or on the online social network. Because of this, the online social networking system may determine the geographic location of the posting.

A tag may be understood to mean data associated with a posting stored in the posting's metadata. A tag may comprise visible content (e.g., hashtag) or invisible metadata (e.g., GPS location, user ID, etc.). As an example, and not by way of limitation, a posting from Elliston Place in Nashville, Tenn. may have the following tags: "nightclub," "nightlife," "dancing," "girlsnightout," "singleladies," and the like. A tag may be one word, such as "donuts," or it may be a blended word (e.g., two or more words without spaces between the words), such as "barcrawl" or "glutenfree." Additionally, a tag may have the "#" sign in front of it to signify that a hashtag is being used.

Figure 2:
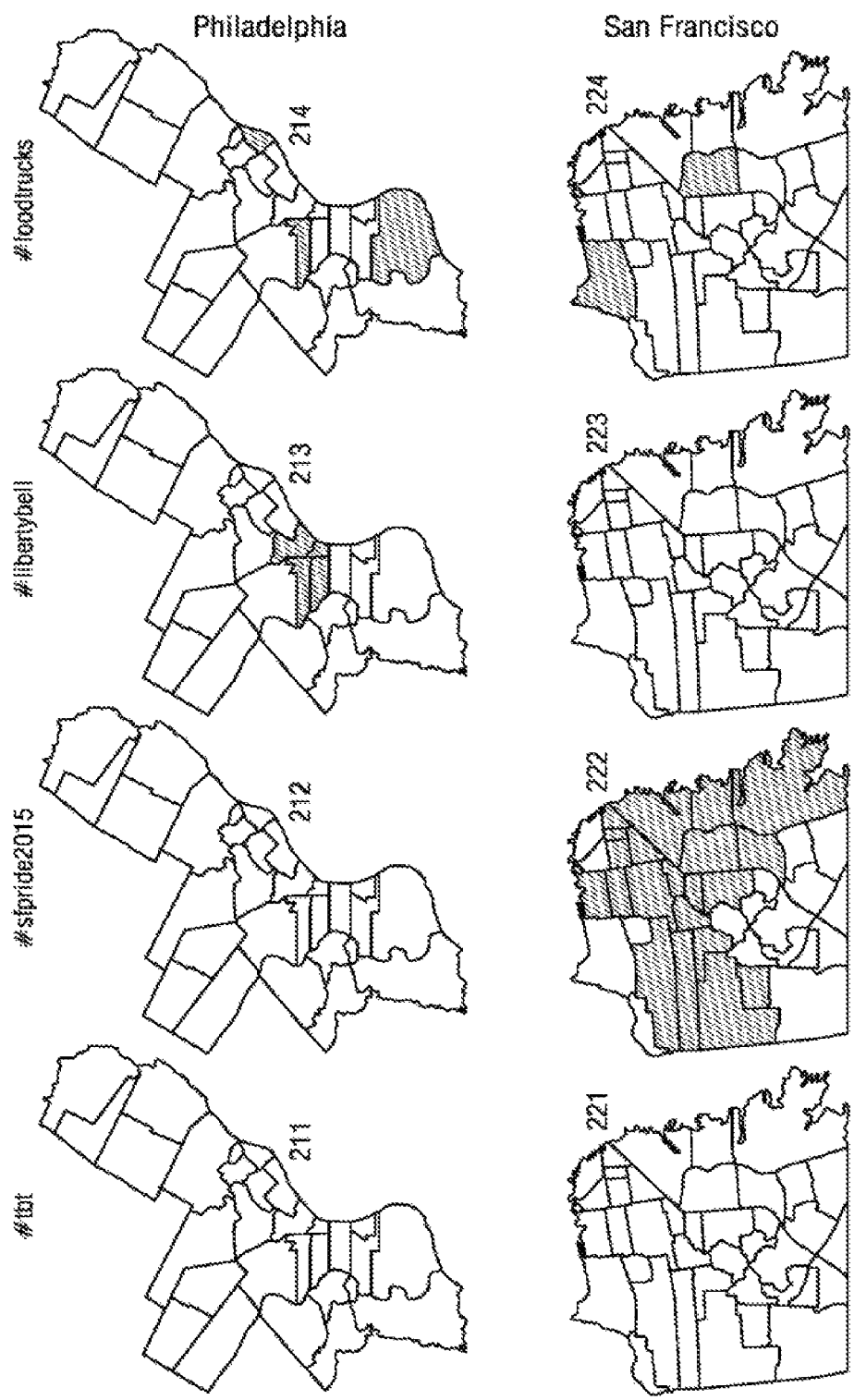
FIG. 2 illustrates an example comparison city map.

The online social networking system may use the location data to determine the subregion from which a given posting originated. In step 120, the online social networking system may identify one region and one subregion from which each posting originated. This may be accomplished by dividing a geographic region (e.g., city) into smaller polygons of subregions (e.g., neighborhoods). As an example, FIG. 2 depicts Philadelphia as a geographic region comprising several subregions. The subregions may be understood to mean neighborhoods. A posting may originate from one neighborhood within the city of Philadelphia, and the online social networking system may identify which neighborhood in Philadelphia from which the posting originates by using the location data associated with the posting.

A region may be understood to mean any group of entities that encompasses one or more subgroups. A subregion may be understood to mean a group of entities that can be categorized under a larger group or entity. Examples of regions include, but are not limited to, school districts, sports leagues, companies, groups of companies, etc. Examples of subregions include, but are not limited to, schools within a school district, teams within a sports league, divisions within a company, etc. In this disclosure, city, state, and region will be used interchangeably. Subregion and neighborhood will also be used interchangeably.

Figure 3:
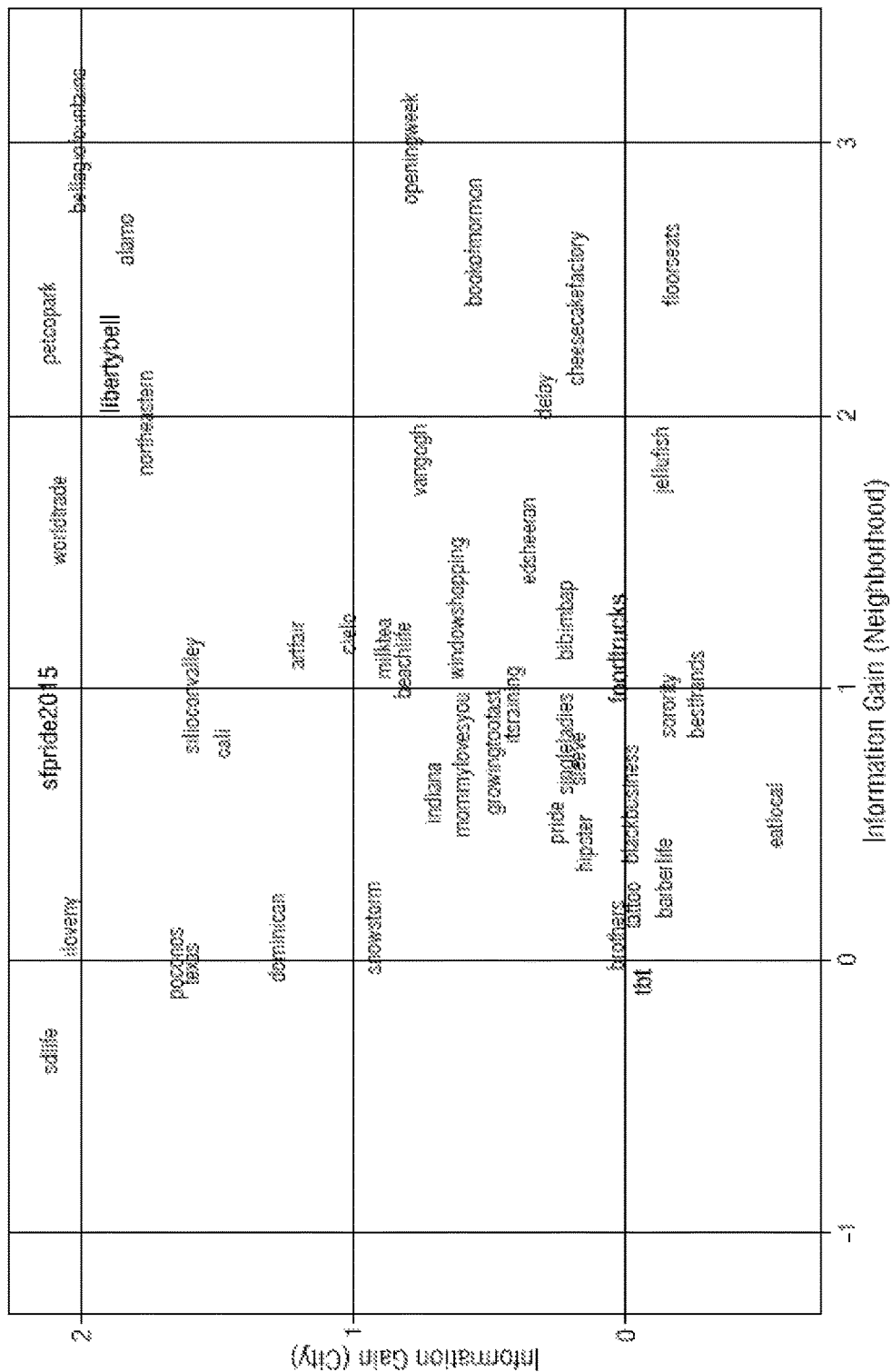
FIG. 3 illustrates an example distribution of tags across two dimensions: region and subregion.

The online social networking system may next begin to aggregate and analyze the received postings. In step 130, the online social networking system may determine a distribution of tags associated with each of the postings. The tags occur across multiple regions and subregions. The distribution may be determined by plotting each tag on two dimensions: how much a tag occurs in specific regions (e.g., cities) versus how often the same tag occurs in specific subregions (e.g., neighborhoods) within those regions. This may be summarized as "tag specificity." FIG. 3 depicts a distribution of tags. Region specificity (e.g., city/state specificity) is plotted along the y-axis, and subregion specificity (e.g., neighborhood specificity) is plotted along the x-axis.

Tags that occur across all cities may be considered to be less specific in the city dimension and may therefore be plotted lower on the y-axis. Examples of tags that have low region specificity include "tbt," "crossfit," and "tattoo." Such tags are nearly ubiquitous; that is, they occur across virtually all regions. Likewise, tags that occur across all neighborhoods in a given region may be considered to be less specific in the neighborhood dimension and may be plotted farther to the left on the x-axis. Examples of tags that have low neighborhood specificity include "tbt," "crossfit," and "tattoo." These tags occur in the same proportion across any given region. As such, they do not communicate much about how a particular neighborhood is different from other neighborhoods in a given city.

Conversely, tags that occur in only one city or region may be highly specific and thus may be plotted high on the y-axis. Examples of tags that are highly specific to a given city include "sfpride2015" and "libertybell." "Sfpride2015" occurs exclusively in the city of San Francisco. "Libertybell" occurs exclusively in the city of Philadelphia. Although these tags provide information about a given location, they may be too specific to provide meaningful information about neighborhoods across multiple cities. Tags that occur in only one neighborhood may also be unhelpful. Such tags may be plotted on the far right of the graph of FIG. 3. Examples of highly specific neighborhood tags include "openingweek," "floorseats" and "cheesecakefactory." Such tags may occur in many major cities and/or states, but merely identify specific buildings within those cities/states, rather than context for characterizing one or more neighborhoods within the state/city. As such, these tags may likely be too specific to characterize a neighborhood.

The area of FIG. 3 that may provide the most information relating to neighborhood characterization may occur near the bottom right quadrant of the graph. Specifically, the area below "mommylovesyou" and to the right of "blackbusiness" may provide hashtags that can be used to characterize neighborhoods. For example, "singleladies" may identify neighborhoods that have a night-life scene, "growingtoofast" may identify neighborhoods with a disproportionate amount of families and children, and "bibimbap" may identify neighborhoods that have a disproportionate amount of Korean restaurants compared to the rest of the regions and/or subregions.

There may be many possible sources for neighborhood patterns in posting tags. Some tags may clearly identify physical traits of a neighborhood. For example, "foodtrucks" and "sorority" may be created because food trucks and sororities may be actually present in a given neighborhood. Other tags may be functions of demographics and culture. For example, "pride" may occur disproportionately frequently in LGBT-friendly neighborhoods and "mommylovesyou" may occur in family or suburban neighborhoods at a higher-than-normal rate. Interestingly, "sleeve" (the tag may represent full-arm tattoos, not clothing) occurs in the relevant area of the graph of FIG. 3, which may mean it carries neighborhood information, but "tattoo" does not. This may suggest that "sleeve" or sleeves (meaning tattoo sleeves) are part of a geographically confined culture, but that the general "tattoo" tag is too mainstream to provide any neighborhood characterization data. Similarly, people in every neighborhood and city may have a "bestfriend," only people in specific neighborhoods (e.g., Federal Hill, Baltimore; Brooklyn, Jacksonville; Roxborough, Philadelphia) may have "bestfrands" at a disproportionately high rate. (Note that the "bestfriends" tag occurs so ubiquitously that it does not provide any neighborhood characterization information; however, "bestfrands" is different. This tag is used at a disproportionately high frequency in certain neighborhoods.)

Region specificity may be determined by implementing a concept called information gain. Information gain, or Kullback-Leibler divergence, is a measure of the logarithmic difference between two probability distributions s/h and s. It may be characterized by the following equation:

$$IG - Plu\frac{P}{P_Q}$$

The above equation may be described as the expectation E of the logarithmic difference between the probabilities s/h and s, where s/h is the probability that a posting occurs in a particular region, given that the posting has a specific tag, and s is the probability that a posting originates from a particular region with any tag or no tag at all. As an example, the probability of a posting originating in California given that it is tagged with "SDlife," may be seven times higher than the probability of a posting originating in California if it does not have the tag "SDlife."

After the online social networking system has determined a distribution of tags associated with the postings in step 130, the method may move to step 140, where tags that are common across multiple subregions but rare in any given region are identified. To identify tags that are common across subregions, the following process may be implemented. For the purposes of this invention, it may be desirable to identify tags with an expectation E under approximately 0.7. When E has a value of less than 0.7, it may mean that the tag occur in most regions. This may be desirable because to provide accurate characterizations of subregions, it may be helpful to first filter out all highly region-specific tags (e.g., those tags that identify only one or two, or relatively few, regions). As an example, the tag "libertybell" may only occur in the region of Philadelphia, because Philadelphia may be the only region that contains the actual Liberty Bell. Thus, the probability that a posting occurs in Philadelphia, given it has the "libertybell" tag (this is the s/h parameter in the above equation), is close to 1; it may be assumed that this value is 0.95. Additionally, the probability that a posting originates in Philadelphia given a random tag or no tag (this is the s parameter in the above equation) may be much less than 1; it may be assumed that this value is 0.05. With these values, the expectation E is calculated to be 2.94, which may be well above the desirable range of less than 0.7. This may indicate that the "libertybell" tag is much too region-specific to be useful in characterizing neighborhoods. Therefore, it is desirable to identify tags that are relatively common across regions.

As an opposing example, the tag "tbt" (short for "throw back Thursday") may occur in virtually all regions. This may mean that for any given posting, the probability s/h, where the given tag is "tbt", is approximately is the same as the probability s. In other words, it is just as likely that a posting tagged with "tbt" originates in a particular region as a posting with no tag or a random tag. Because s/h and s are the same, E=0. When E=0, there is no information gain, which may mean that there is no information to be gained from the particular tag. This may a desirable outcome in the region dimension (y-axis of the graph in FIG. 3) because it is desirable to identify tags that occur in many, if not all, regions.

In the subregion dimension, it may be desirable to identify tags that are subregion-specific. The desirable range of Expectancy E for the subregion dimension (x-axis of the graph in FIG. 3) may be between 0.2 and 1.6. Tags that fall in this range on the x-axis of FIG. 3 may comprise the appropriate amount of information gain to be descriptive of the subregion in which they originate. The tags "singleladies," "foodtrucks," and "sorority" are examples of tags that may fall in the desirable subregion-specificity range. Tags farther to the left of the desirable range (e.g., tags with expectancy E below 0.2) may be too ubiquitous to be descriptive of any particular subregions. Tags farther to the right of the desirable range (e.g., tags with expectancy E above 1.6) may be too specific to be useful. That is, they may be so specific that they identify a particular building or location. Examples of these tags include "bellagiofountains" (this tag occurs in one region (Las Vegas) and only one subregion (the Las Vegas Strip)), and "floorseats" (this tag may occur in many regions (any city with a concert or sporting venue) but usually in only one subregion within any given region). These highly specific tags may be too narrow to provide accurate characterizations of neighborhoods.

The relationship between region specificity and subregion specificity may be illustrated by the maps of FIG. 2. The darkened subregions of FIG. 2 may represent neighborhoods where the relevant tag appears at a higher concentration than that observed across the other regions and subregions in the United States. FIG. 2 illustrates the regions of Philadelphia and San Francisco. In maps 211 and 221, it can be seen that the tag "tbt" does not occur at a higher than average rate in either region. This may be expected because "tbt" may occur uniformly throughout the United States. Thus, no particular subregion will use the "tbt" tag at a higher than normal concentration. In maps 212 and 222, it can be seen that the tag "sfpride2015" does not occur in higher-than-normal concentrations in Philadelphia, but it does occur at above average concentrations in San Francisco. This may be because San Francisco is the home of the annual SF Pride Parade. In maps 213 and 223, it can be seen that the tag "libertybell" occurs at a highly concentrated level in just a few subregions of Philadelphia, but does not occur at a higher than normal concentration in San Francisco. This may be because the Liberty Bell is located in or near the shaded subregions of map 213.

Maps 214 and 224 illustrate an example of a tag that is useful in providing a characterizing description of subregions. The tag "foodtrucks" may occur in a few subregions in both regions. It may also be assumed that the "foodtrucks" tag occurs in a few subregions in several regions. This may coincide with an observance of most metropolitan cities: most large cities have a few locations where several food trucks congregate on a consistent basis. This may be known as a "Food Truck Round-Up." Examples of Food Truck Round Ups occurring in a few specific neighborhoods within cities includes the food trucks that can be found on most weekdays in DuPont Circle in Washington, D.C., the food trucks that congregate every Thursday on Gallivan Avenue un Salt Lake City, Utah, and the food trucks that gather on certain Tuesdays on the corner of Page Mill and El Camino Real in Palo Alto, Calif. Therefore, it may be likely that most regions (e.g., cities) contain neighborhoods that are popular food truck destinations. Knowing which neighborhoods are popular food truck destinations may be useful to consumers, advertisers, other food trucks, community organizations, local businesses, and the like. The applications of neighborhood characterization will be discussed below.

After a distribution of tags is determined, the online social networking system may generate a neighborhood characterization for a particular subregion in step 150. This may be accomplished by identifying groups of hashtags that occur in the same subregion. To identify groups of hashtags that occur in the same subregion and that describe or point to a particular topic, a topic model may be used. In natural language processing, a topic model is a type of statistical model for discovering the abstract topics that occur in a collection of documents. Thus, each neighborhood may be treated as a collection of documents that are related to a particular topic. To identify a topic, Latent Dirichlet allocation ("LDA") may be used to determine the probabilities of various tags occurring. In the instant application, the neighborhoods may be treated as documents containing several tags. Additionally, any number of topics may be set, but typically the number of topics may range from ten topics to thirty topics. The Latent Dirichlet allocation model may identify which topics are most prevalent for a particular neighborhood.

LDA may be used to discover topics within documents. A document may be any medium that contains words (e.g., a sentence, article, social media post, etc.) In this case, the documents may be represented by neighborhoods. Each neighborhood may be associated with several hashtags, which represent words. LDA may also determine the strength of each topic within a given document. For a selected number of K topics, LDA may learn the topic representation for each document (e.g., neighborhood) and the words (e.g., hashtags) associated to each topic.

For a given document and a given number K of topics, LDA may be used to compare the document to other documents with known topics to determine the proportion of the K topics that are found in the given document. LDA may be implemented via the following steps. First, the number of topics is chosen. This may be an informed estimate or a random number. Second, an algorithm may assign every non-function word to a temporary topic according to a Dirichlet distribution. A Dirichlet distribution is a type of probability distribution and may be semi-random. Third, an algorithm may check and update topic assignments for each word in every document. Each word's topic assignment is updated based on two criteria: the prevalence of that word across topics, and the prevalence of topics in the document. Based on these two criteria, the word may be assigned to a particular topic. The process of checking topic assignments may be repeated for each word in every document, and the entire set of documents may be cycled through several times. This iterative updating may allow LDA to generate a final set of topics for each document.

FIG. 4 is an example word cloud of a particular topic: "Asian Food." Using the Latent Dirichlet allocation model, it was determined that particular neighborhoods may be characterized as having Asian Food. These neighborhoods may include Strawberry Park, San Jose, Calif.; Homestead Kiely, Santa Clara, Calif.; and Pruneridge Tantau, Cupertino, Calif. The word cloud below the title "Asian Food" may be representative of the tags that appear in the above neighborhoods at an above-normal rate. Thus, the aforementioned neighborhoods may have a higher density of Asian style restaurants. In particular embodiments, a representative word cloud may also include words that appear larger or smaller than other words to illustrate the prevalence of the tags. For example, in the exemplary word cloud of FIG. 4, the words "sofull," "noodlesoup," and "vietnamesefood" appear larger than the rest of the words. This may be used to illustrate that these three tags appear more often in postings than the other words in the word cloud.

Examples of other neighborhood characterizations and the associated neighborhoods may include the following characterization, neighborhoods, and tags. The characterization "Bars" may accurately describe Cochran Heights in Dallas, Tex.; Chatham Arch in Indianapolis, Ind.; and Greenwood in Nashville, Tenn. Representative tags may include "beergarden," "patiolife" "winenight," and "margaritamonday." The characterization "Tourists Downtown" may accurately describe Times Square in Manhattan, N.Y., Mount Olympus in Universal City, Calif., and Quincy Market in Boston, Mass. Representative tags may include "performingarts," "iceskating," "cultured," and "citycenter." The characterization "Family and Home" may accurately describe Cyprus Gardens in Brooklyn, N.Y., South Richmond Hill in Queens, N.Y., and Mount Hope in Bronx, N.Y. Representative tags may include "mynieces," "happyfather," "sisinlaw," and "mymomisbetterthanyours." The characterization "Artisanal Hipsters" may accurately describe Chestnut in Austin, Tex., Woodlawn in Portland, Oreg., and Harrison-Denny-Blaine in Seattle, Wash. Representative tags may include "buylocal," "microbrew," "urbanfarming," and "screenprint." These are neighborhoods with "distillerys," where people live the "vanlife" and practice "glassblowing." The characterization "Bohemian Urbanists" may accurately describe Vinegar Hill in Brooklyn, N.Y., Castro in San Francisco, Calif., and NoLita in Manhattan, N.Y. Representative tags may include "urbanexplorer," "prideweek," "cityart," and "maplesyrup." As a final example, the characterization "Parks" may accurately describe Park Hill in Fort Worth, Tex., National Arboretum in Washington, D.C., and Arlington Heights in Portland, Oreg. Representative tags may include "zoo," "childrensmuseum," "picnic," and "naturewalk."

The name of the characterization for a particular neighborhood (e.g., "Family and Home for Cyprus Gardens, "Parks" for Arlington Heights, etc.) may be human generated or machine generated. A machine generated characterization name may be formed using natural language processing and/or machine learning, or through a combination of computer algorithm and human generation. For example, a human may identify one or more topics, preferably hundreds of topics, into which tags may be categorized. Then a computer algorithm may categorize tags into each topic. As another example, the online social networking system may auto-generate characterizations from the bag of tags in each neighborhood. This may be accomplished by simply using the most common tag, or by using natural language processing to In particular embodiments, the online social networking system may also describe a particular subregion in terms of one or more characterizations. For example, a neighborhood may be accurately described as both "outdoorsy" and progressive. The online social networking system disclosed herein may determine a composite characterization by determining how outdoorsy and how progressive the neighborhood is. As another example, it may be found that the neighborhood of Haight Ashbury in San Francisco, Calif. is 30% "Artisanal Hipster," 30% "Coffee Shops," and 40% "Music and Theatre." This may be accomplished using LDA to determine the content spread of the tags that are found in the Haight Ashbury neighborhood. Haight Ashbury may be treated as a document or collection of documents, and the tags may be analyzed using the "bag-of-words" model. The bag of words model is a technique used in natural language processing that treats sentences like a bag of words, disregarding grammar and word order, but accounting for word frequency. As such, the bag of words model may be well-suited to analyze tags associated with postings. The online social networking system may also be able to derive the proportions that each tag constitutes in a given characterization.

The online social networking system may also quantify the similarity between different subregions using a technique called cosine similarity. Using this technique, each neighborhood may be treated as a document. The tags associated with postings originating in that neighborhood may be treated as a "bag of words." Using LDA, a characterization score may be computed in each of one or more neighborhood characterizations (e.g., hipster, foodie, residential). As an example and not by way of limitation, a particular neighborhood may receive the following characterization scores: 0.38 hipster, 0.25 foodie, and 0.16 residential. Any number of neighborhood characterizations may be used, and this process may be repeated for one or more neighborhoods. The cosine similarity between any two neighborhoods may then be computed using the characterization scores of each neighborhood. The cosine similarity calculation may allow the online social networking system to quantify the similarity between two different neighborhoods. For example, the most similar neighborhoods in Philadelphia, Memphis, Dallas, Cleveland, San Francisco, and Seattle may be identified using a cosine similarity calculation. This invention is not limited to cosine similarity to detect similar subregions. This disclosure contemplates any suitable method for detecting the similarity between documents, including, but not limited to Bayesian filters, shingling, or any other suitable process.

In particular embodiments, cosine similarity may be alternatively computed using term frequency-inverse document frequency ("tf-idf") analysis. This technique may also treat each neighborhood as a document, and tags associated with postings originating in a given neighborhood as a "bag of words." The neighborhoods may then be transformed into tf-idf vectors, and the cosine similarity computed from those vectors.

Finally, in step 160, the online social networking system may apply the characterization in a variety of ways. Identifying characteristics of particular neighborhoods, and/or identifying neighborhoods that have particular characteristics may be beneficial for a variety of purposes. Advertisers may wish to target particular neighborhoods with certain advertisements. For example, if it is discovered that Rossmoor in Orange County, Calif. may be characterized as a treehouse building neighborhood, a commercial treehouse builder and supplier may decide to target advertisements to residents of Rossmoor. Another application of the invention may include its integration with a vacation rental website. A complaint of users of such online vacation rental services may include that consumers ar110e unfamiliar with the neighborhood in which the rental is located, and may thus feel uneasy about booking a rental in a particular neighborhood. However, if the consumer could understand what the neighborhood was like (e.g., view a neighborhood characterization or a composite neighborhood characterization of a particular neighborhood), the consumer would be able to make a better informed decision on whether to rent in that particular neighborhood. As an example, if a consumer desired to visit Seattle, but had never been to Seattle, she could view all the available rental listings in Seattle, and for each listing, view the neighborhood's characterization and other relevant information about the neighborhood (e.g., particular postings, tags, composite characterization, etc.). This would allow the consumer to quickly identify neighborhoods which suit her personal interests.

Additionally, a commercial enterprise may desire to place similar ads in similar neighborhoods. Alternatively, if a particular ad campaign performs particularly well in a particular neighborhood, the advertiser may desire to target other similar neighborhoods across the country or world. For example, an advertisement for sunscreen may do particularly well in Presidio in San Francisco, Calif. It may be found that Presidio may be characterized as a "food truck" neighborhood. It may be the case that people waiting in line for food at the food trucks are concerned about being sunburned while they wait for their food, so they convert on the sunscreen advertisements sent to their mobile devices. To further take advantage of this correlation, an advertiser may wish to target other neighborhoods that are also characterized as "food truck" neighborhoods.

The embodiments disclosed herein are not limited to geographic regions and geographic subregions. Any suitable group and subgroup may be used in place of "city" and "neighborhood," respectively. As an example, it may be desirable to determine a characterization of a particular school (e.g., subregion or subgroup) within a school district (e.g., region or group). The same techniques may be applied to this school-school district relationship. Postings may be received and categorized based on any one of a physical location, a user identity, an organization with which the user is affiliated (e.g., the user is a student at a particular high school), or other information contained in the user's social graph. Postings may also be categorized based on a user's social-graph affinity, in addition to or in the alternative of location data. For example, if the online social networking system learns that Billy attends Oak Park High School in Kansas City, Mo., the online social networking system may categorize a posting from Billy as "originating in" Oak Park High School, regardless of the actual geographical location from which the positing originated. In this way, the online social networking system may generate accurate characterizations of schools, organizations, and the like. Social-graph data and social-graph affinity is explained in greater detail below.

Alternatively, in particular embodiments, the online social networking system may categorize postings according to user interests and sub-interests across one or more different verticals. Thus, "interest" may act as regions, and "sub-interests" may act as subregions. "Verticals" may comprise geographic areas, organizations (e.g., school districts, companies, clubs, etc.), music, sports, entertainment, etc. For example, a vertical may be music, an interest may be classic rock, and a sub-interest may be Lynyrd Skynyrd. If the online social networking system learns that Alice is a fan of Lynyrd Skynyrd because she liked "Sweet Home Alabama," the online social networking system may categorize Alice's postings in the "Lynyrd Skynyrd" sub-interest in the same manner the online social networking system would categorize Alice's postings originating from a particular neighborhood. In other words, "Lynyrd Skynyrd" may be treated as a neighborhood (e.g., subregion), and "classic rock" may be treated as a city (e.g., region). Thus, the online social networking system may perform the same analyses on interests and sub-interests as it does on regions and subregions. Therefore, the online social networking system may identify similarities between fans of different groups across different genres of music. For example, it may be discovered that fans of Lynyrd Skynyrd shares specific attributes with fans of Taylor Swift, analogous to how different neighborhoods share specific attributes.

Other applications of the invention may include serving targeted advertisements based on the geographic location data and neighborhood characterization, ranking content in a user's newsfeed based on a particular neighborhood characterization, suggesting purchases for a user to buy, and/or suggesting events that user may be interested in attending.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Figure 6:
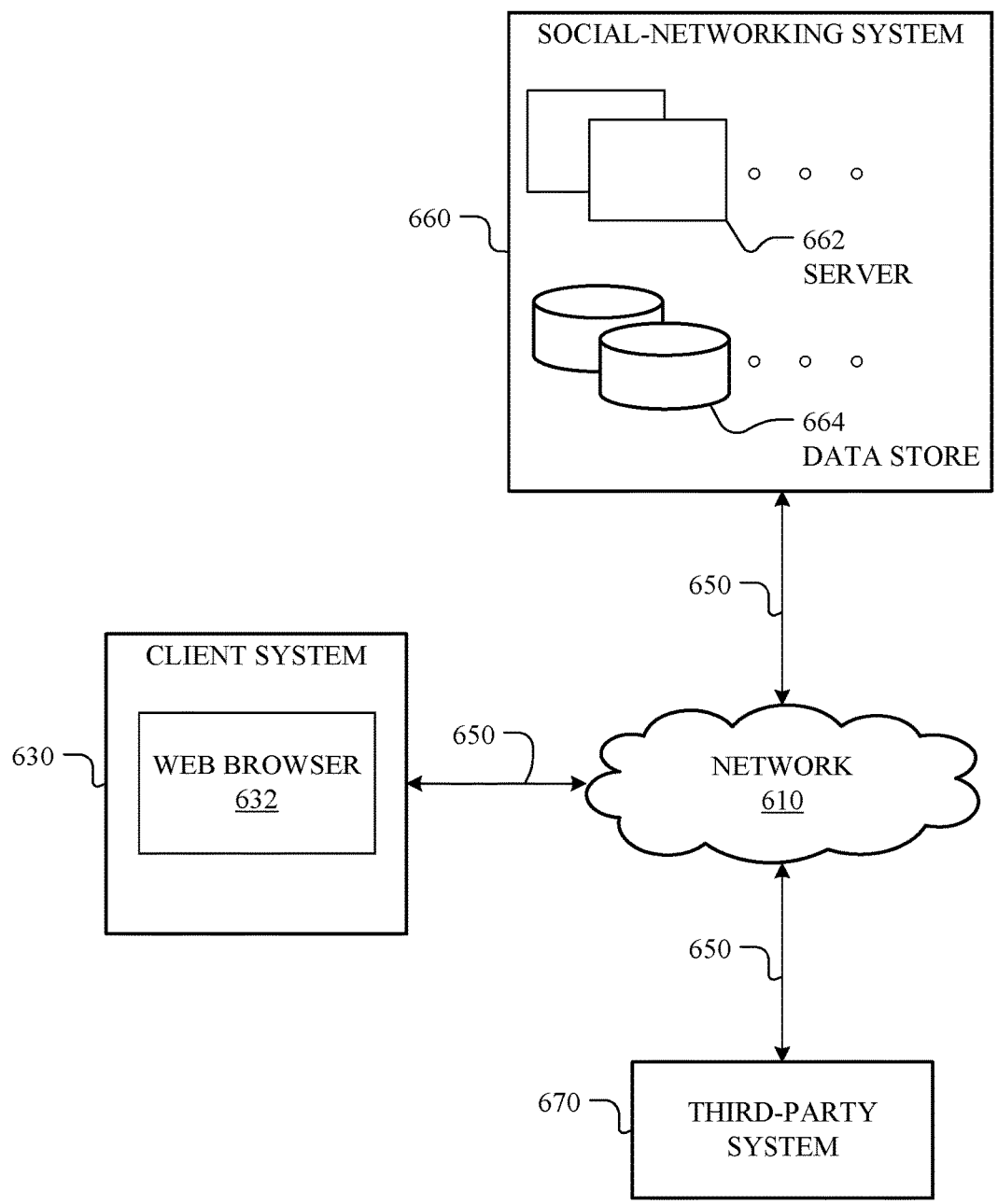
FIG. 6 illustrates examples of a social networking system, a network, a client system, and a third party system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client systems 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 664 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 whom they want to be connected to. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 5:
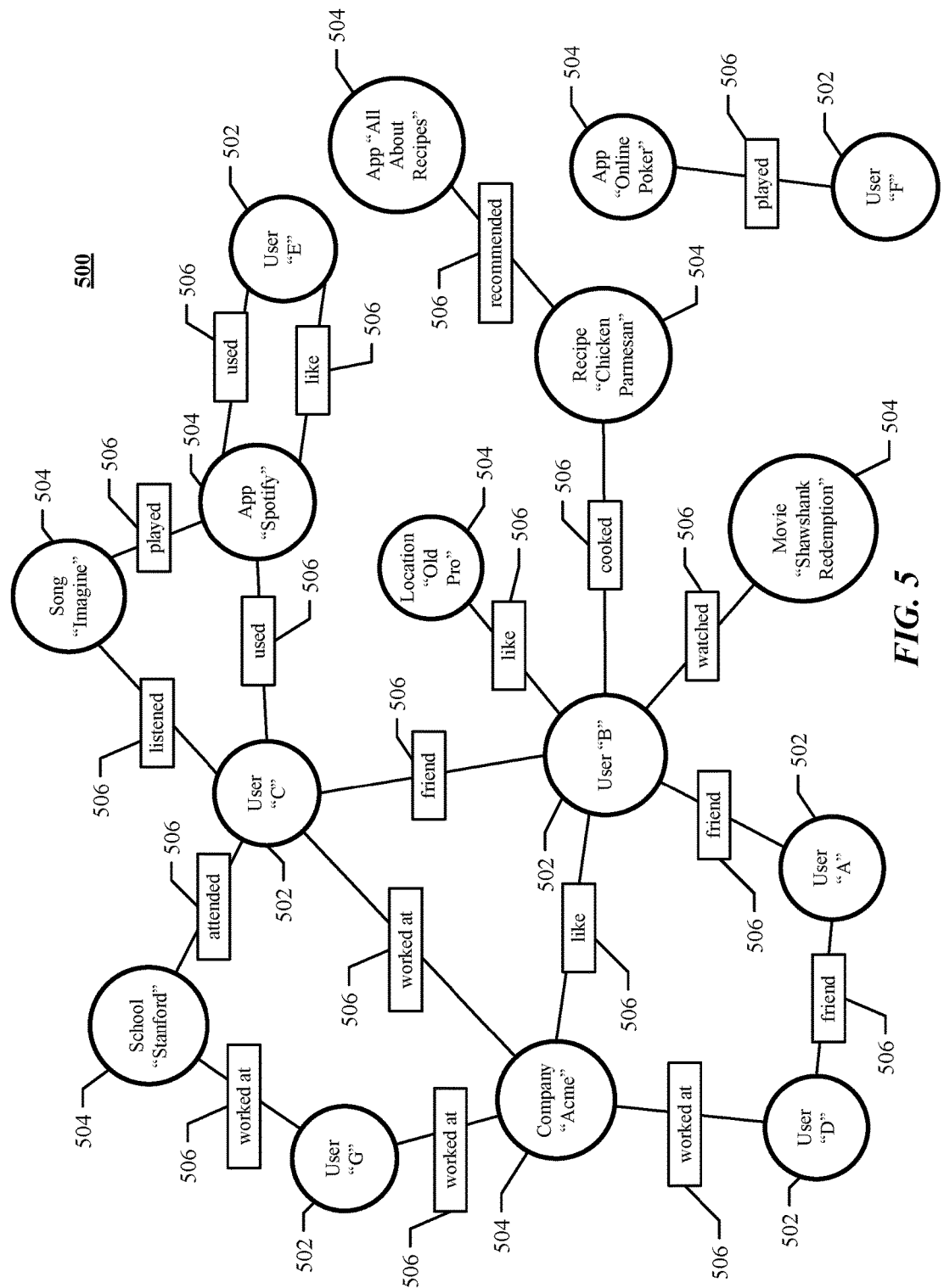
FIG. 5 illustrates an example social graph.

FIG. 5 illustrates example social graph 500. In particular embodiments, social-networking system 660 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 660, client system 630, or third-party system 670 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 660. In particular embodiments, a user node 502 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 660. Profile pages may also be hosted on third-party websites associated with a third-party server 670. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 630 to send to social-networking system 660 a message indicating the user's action. In response to the message, social-networking system 660 may create an edge (e.g., an "eat" edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 506 connecting the first user's user node 502 to the second user's user node 502 in social graph 500 and store edge 506 as social-graph information in one or more of data stores 664. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 660 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 660 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 660 may create an edge 506 between a user node 502 and a concept node 504 in social graph 500. As an example and not by way of limitation, a user viewing a concept-profile page (such as, for example, by using a web browser or a special-purpose application hosted by the user's client system 630) may indicate that he or she likes the concept represented by the concept node 504 by clicking or selecting a "Like" icon, which may cause the user's client system 630 to send to social-networking system 660 a message indicating the user's liking of the concept associated with the concept-profile page. In response to the message, social-networking system 660 may create an edge 506 between user node 502 associated with the user and concept node 504, as illustrated by "like" edge 506 between the user and concept node 504. In particular embodiments, social-networking system 660 may store an edge 506 in one or more data stores. In particular embodiments, an edge 506 may be automatically formed by social-networking system 660 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 660). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 660 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 660) or RSVP (e.g., through social-networking system 660) to an event associated with the advertisement. In addition or as an alternative, an advertisement may include social-networking-system context directed to the user. As an example and not by way of limitation, an advertisement may display information about a friend of the user within social-networking system 660 who has taken an action associated with the subject matter of the advertisement.

In particular embodiments, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user may make frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 660 may calculate a coefficient based on the type of relationship between particular objects. Referencing the social graph 500, social-networking system 660 may analyze the number and/or type of edges 506 connecting particular user nodes 502 and concept nodes 504 when calculating a coefficient. As an example and not by way of limitation, user nodes 502 that are connected by a spouse-type edge (representing that the two users are married) may be assigned a higher coefficient than a user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular embodiments, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 500. As an example and not by way of limitation, social-graph entities that are closer in the social graph 500 (e.g., fewer degrees of separation) may have a higher coefficient than entities that are further apart in the social graph 500.

In particular embodiments, social-networking system 660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular embodiments, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular embodiments, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular embodiments, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 504 corresponding to a particular photo may have a privacy setting specifying that the photo may only be accessed by users tagged in the photo and their friends. In particular embodiments, privacy settings may allow users to opt in or opt out of having their actions logged by social-networking system 660 or shared with other systems (e.g., third-party system 670). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 7:
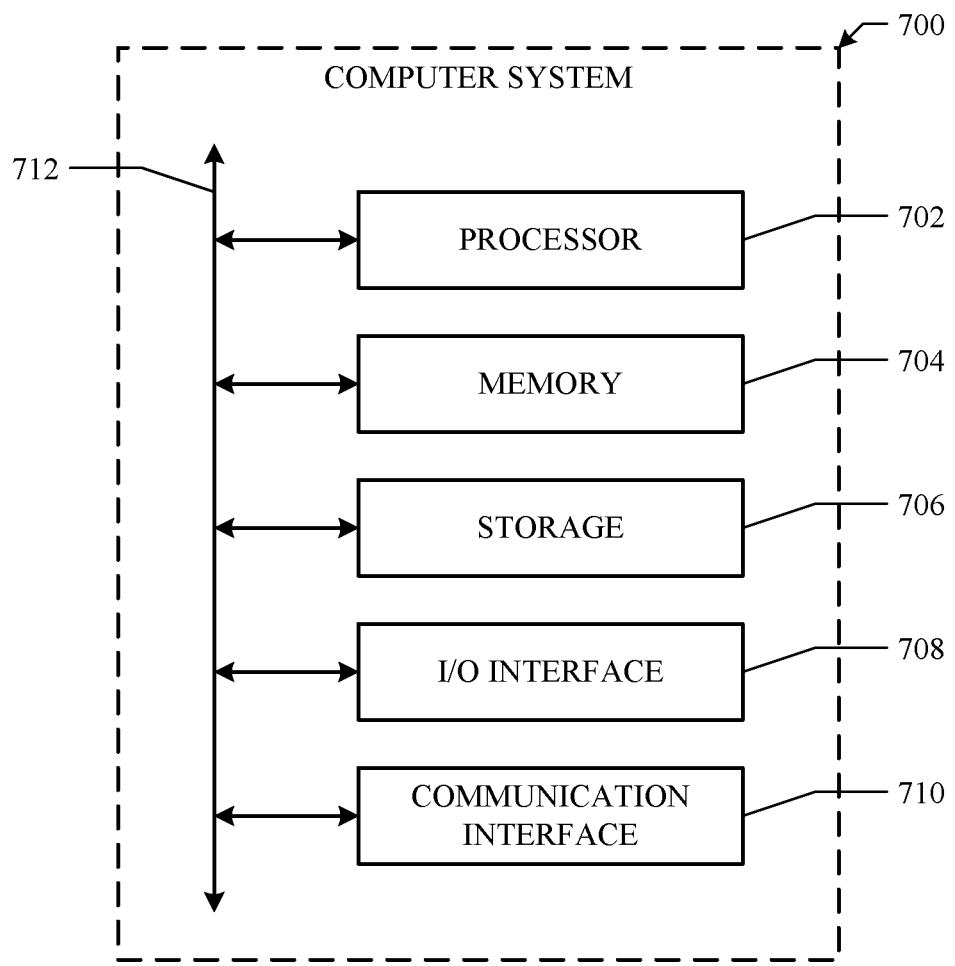
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computing device, receiving postings submitted by one or more users of a social-networking system, wherein a posting comprises location data and one or more tags;
    by the computing device, for each of the postings, based on the location data, identifying one of a plurality of regions and one of a plurality of subregions within the regions;
    by the computing device, determining a distribution of the tags according to two data dimensions, wherein the two data dimensions include a first one of the data dimensions comprising a degree of ubiquity of each tag across the regions and a second one of the data dimensions comprising a degree of ubiquity of the same tag across the subregions within the different regions;
    by the computing device, based on the distribution, identifying one or more of the tags that are common to multiple ones of the subregions across the different regions with respect to information gains of the respective tags, wherein each information gain is a measure of difference between two probability distributions, wherein the two probability distributions includes a probability distribution that a posting occurs in a particular region with a tag and a probability distribution that the same posting originates from the particular region;
    by the computing device, generating a neighborhood characterization based on the identified tags;
    by the computing device, receiving one or more requests for characterizing particular items; and
    by the computing device, applying the neighborhood characterization to the particular items.

2. The method of claim 1, wherein a region comprises a state, province, county, or a city, and wherein a subregion comprises a neighborhood.

3. The method of claim 1, further comprising:
    generating a visual representation of the distribution of the tags.

4. The method of claim 1, wherein generating a neighborhood characterization based on the identified tags comprises applying natural language processing to content associated with the postings to generate the neighborhood characterization.

5. The method of claim 1, wherein applying the neighborhood characterization comprises sending sponsored content to one or more users of the social networking system that belong to a particular subregion, based on the success of the sponsored content in one or more different subregions with a similar degree of ubiquity of the tags across the subregions in the regions.

6. The method of claim 1, wherein identifying one or more of the tags that are common to multiple ones of the subregions across the different regions comprises identifying tags that occur above a pre-determined rate among a plurality of users located within a single subregion.

7. The method of claim 1, further comprising:
    generating a visual representation of the neighborhood characterization.

8. The method of claim 1, wherein the neighborhood characterization comprises a composite characterization of two or more different topics.

9. The method of claim 1, further comprising generating one or more additional neighborhood characterizations based on the identified tags from one or more additional neighborhoods; and
    quantifying the similarity between tags of different neighborhoods.

10. One or more computer-readable non-transitory storage media embodying software that is operable when executed to:
    receive postings submitted by one or more users of a social-networking system, wherein a posting comprises location data and one or more tags;
    for each of the postings, based on the location data, identify one of a plurality of regions and one of a plurality of subregions within the regions;
    determine a distribution of the tags according to two data dimensions, wherein the two data dimensions include a first one of the data dimensions comprising a degree of ubiquity of each tag across the regions and a second one of the data dimensions comprising a degree of ubiquity of the same tag across the subregions within the different regions;
    based on the distribution, identify one or more of the tags that are common to multiple ones of the subregions across the different regions with respect to information gains of the respective tags, wherein each information gain is a measure of difference between two probability distributions, wherein the two probability distributions includes a probability distribution that a posting occurs in a particular region with a tag and a probability distribution that a posting originates from the particular region;
    generate a neighborhood characterization based on the identified tags;
    receive one or more requests for characterizing particular items; and
    apply the neighborhood characterization to the particular items.

11. The media of claim 10, wherein a region comprises a state, province, county, or a city, and wherein a subregion comprises a neighborhood.

12. The media of claim 10, wherein the software is further operable when executed to generate a visual representation of the distribution of the tags.

13. The media of claim 10, wherein generating a neighborhood characterization based on the identified tags comprises applying natural language processing to content associated with the postings to generate the neighborhood characterization.

14. The media of claim 10, wherein applying the neighborhood characterization comprises sending sponsored content to one or more users of the social networking system that belong to a particular subregion, based on the success of the sponsored content in one or more different subregions with a similar degree of ubiquity of the tags across the subregions in the regions.

15. The media of claim 10, wherein identifying one or more of the tags that are common to multiple ones of the subregions across the different regions comprises identifying tags that occur above a pre-determined rate among a plurality of users located within a single subregion.

16. The media of claim 10, wherein the software is further operable when executed to generate a visual representation of the neighborhood characterization.

17. The media of claim 10, wherein the neighborhood characterization comprises a composite characterization of two or more different topics.

18. The media of claim 10, wherein the software is further operable when executed to generate one or more additional neighborhood characterizations based on the identified tags from one or more additional neighborhoods; and
    quantify the similarity between tags of different neighborhoods.

19. A system comprising: one or more processors; and a memory coupled to the processors comprising instructions executable by the processors, the processors being operable when executing the instructions to:
    receive postings submitted by one or more users of a social-networking system, wherein a posting comprises location data and one or more tags;
    for each of the postings, based on the location data, identify one of a plurality of regions and one of a plurality of subregions within the regions;
    determine a distribution of the tags according to two data dimensions, wherein the two data dimensions include a first one of the data dimensions comprising a degree of ubiquity of each tag across the regions and a second one of the data dimensions comprising a degree of ubiquity of the same tag across the subregions within the different regions;
    based on the distribution, identify one or more of the tags that are common to multiple ones of the subregions across the different regions with respect to information gains of the respective tags, wherein each information gain is a measure of difference between two probability distributions, wherein the two probability distributions includes a probability distribution that a posting occurs in a particular region with a tag and a probability distribution that a posting originates from the particular region;
    generate a neighborhood characterization based on the identified tags;
    receive one or more requests for characterizing particular items; and
    apply the neighborhood characterization to the particular items.

20. The system of claim 19, wherein the processors are further operable when executing the instructions to generate one or more additional neighborhood characterizations based on the identified tags from one or more additional neighborhoods; and
    quantify the similarity between tags of different neighborhoods.

* * * * *